US011413821B2

(12) United States Patent
Swartz et al.

(10) Patent No.: US 11,413,821 B2
(45) Date of Patent: Aug. 16, 2022

(54) POWDER REFILL SYSTEM FOR 3-DIMENSIONAL PRINTING

(71) Applicant: Impossible Objects, Inc., Northbrook, IL (US)

(72) Inventors: Robert Swartz, Highland Park, IL (US); Eugene Gore, Des Plaines, IL (US)

(73) Assignee: IMPOSSIBLE OBJECTS, INC., Northbrook, IL (US)

( * ) Notice: Subject to any disclaimer, the term of this patent is extended or adjusted under 35 U.S.C. 154(b) by 0 days.

(21) Appl. No.: 17/156,541

(22) Filed: Jan. 23, 2021

(65) Prior Publication Data

US 2021/0229359 A1  Jul. 29, 2021

Related U.S. Application Data

(60) Provisional application No. 62/965,089, filed on Jan. 23, 2020.

(51) Int. Cl.
*B29C 64/321* (2017.01)
*B22F 12/50* (2021.01)
*B33Y 30/00* (2015.01)

(52) U.S. Cl.
CPC ............ *B29C 64/321* (2017.08); *B22F 12/50* (2021.01); *B33Y 30/00* (2014.12)

(58) Field of Classification Search
CPC ............................... B29C 64/321; B01F 15/02
See application file for complete search history.

(56) References Cited

U.S. PATENT DOCUMENTS 9,393,770 B2   7/2016  Swartz
9,776,376 B2  10/2017  Swartz
(Continued)

FOREIGN PATENT DOCUMENTS

WO   2019005042 A1   1/2019
WO   2019094278 A1   5/2021

OTHER PUBLICATIONS

International Search Report and Written Opinion of the International Searching Authority for Application PCT/US2021/014812, dated May 17, 2021, 10 Pages.

*Primary Examiner* — Niki Bakhtiari
*Assistant Examiner* — Nicholas J Chidiac
(74) *Attorney, Agent, or Firm* — Dunlap Bennett & Ludwig, PLLC (57) ABSTRACT

A powder refill system for a CBAM process that makes changing a powder container simple and maintains the smallest possible distribution change during the print process. The system automates a constantly low trough powder level during a print and reduces the number of times the powder is recirculated. The system uses a sensor to sense the amount of powder in a tray and a compressed air powder application system to force powder into the system. Powder enters the system from a powder bottle mounted upside-down on a plate with an orifice and mixing chamber and a stainless-steel "aeration stone" This is a fitting with porous walls, where porosity is finer than most of particulate matter of the powder being used. Air can enter through the fitting, broken down into microscopic streams, but powder cannot enter back into the air supplying line. The powder aerosol is then used in the printing/flooding process. A mounting plate allows easy replacement of the powder bottle.

5 Claims, 8 Drawing Sheets

Section A-A (56) References Cited

U.S. PATENT DOCUMENTS

| | | | |
|---|---|---|---|
| 9,827,754 B2 | 11/2017 | Swartz | |
| 9,833,949 B2 | 12/2017 | Swartz | |
| 10,046,552 B2 | 8/2018 | Swartz | |
| 10,252,487 B2 | 4/2019 | Swartz | |
| 10,350,877 B2 | 7/2019 | Swartz | |
| 10,377,080 B2 | 8/2019 | Swartz | |
| 10,377,106 B2 | 8/2019 | Swartz | |
| 10,384,437 B2 | 8/2019 | Swartz | |
| 10,597,249 B2 | 3/2020 | Swartz | |
| 10,751,987 B2 | 8/2020 | Swartz | |
| 10,934,120 B2 | 3/2021 | Swartz | |
| 11,110,659 B2 * | 9/2021 | Chanclon Fernandez | B29C 64/255 |
| 2002/0020461 A1 * | 2/2002 | Platsch | B05B 12/04 141/153 |
| 2015/0151319 A1 * | 6/2015 | Michael | B05B 5/1683 118/300 |
| 2017/0151719 A1 | 6/2017 | Swartz | |
| 2017/0274595 A1 | 9/2017 | Swartz et al. | |
| 2017/0291223 A1 | 10/2017 | Swartz | |
| 2018/0072001 A1 | 3/2018 | Swartz | |
| 2018/0264725 A1 | 9/2018 | Swartz | |
| 2018/0264732 A1 * | 9/2018 | Swartz | B29C 64/329 |
| 2018/0281284 A1 * | 10/2018 | Elgar | B29C 64/364 |
| 2019/0084046 A1 | 3/2019 | Swartz | |
| 2019/0084231 A1 * | 3/2019 | Chanclon Fernandez | B29C 64/20 |
| 2019/0202164 A1 | 7/2019 | Swartz | |
| 2019/0366626 A1 | 12/2019 | Swartz | |
| 2020/0223131 A1 | 7/2020 | Swartz | |
| 2020/0384783 A1 | 12/2020 | Swartz | |

* cited by examiner

Section A-A

POWDER REFILL SYSTEM FOR 3-DIMENSIONAL PRINTING

This application is related to, and claims priority from, U.S. Provisional Patent Application No. 62/965,089. Application 62/965,089 and U.S. Pat. Nos. 9,393,770; 9,776,376; 9,827,754; 9,833,949; 10,046,552; 10,252,487; 10,377,080; 10,377,106; 10,384,437; 10,597,249 are hereby incorporated by reference in their entireties.

BACKGROUND

Field of the Invention

The present invention relates to 3-dimensional (3-D) printing and more particularly to powder refill in a 3-D printing machine.

Description of the Problem Solved

Composite-Based Additive Manufacturing (CBAM) is a process where sections of a 3-dimensional object are printed on substrate sheets (e.g., carbon fiber) section-by-section using an inkjet printer or lithographic techniques. The printing typically uses an aqueous ink solution, but in some embodiments, can use other solutions or inks. The substrates are then flooded with a powder that can be a thermoplastic material, theromoset metal or other powder. A trough is used as the final holder of powder before the flooding occurs. The powder coming from the trough adheres only to the wet (printed) portions of the substrate. Excess powder is removed from the sheets, and the sheets are stacked on top of one-another. The stack is typically compressed and heated causing the powder layers to fuse forming the 3-D object. Excess solid material can then be removed by abrasion, sand-blasting, chemical means or other removal technique.

Figure 1:
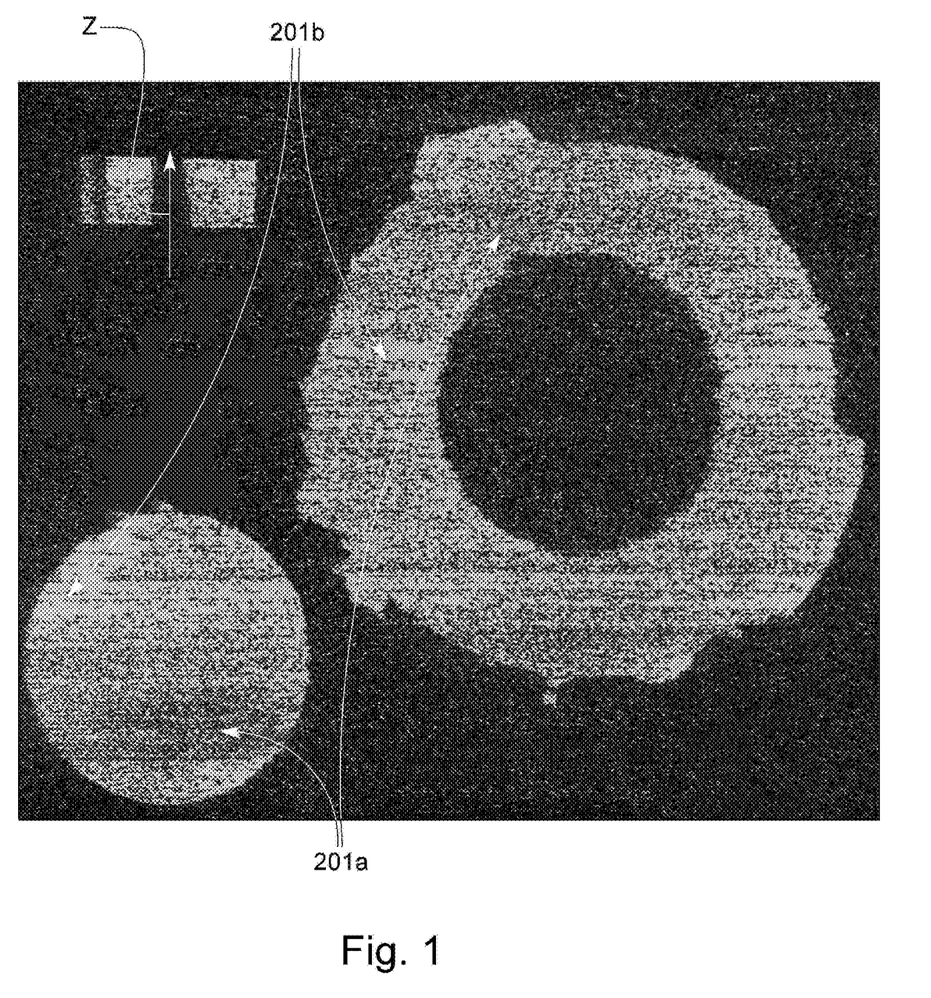
FIG. 1 shows CT scans of regions where there is more or less powder.
Figure 2:
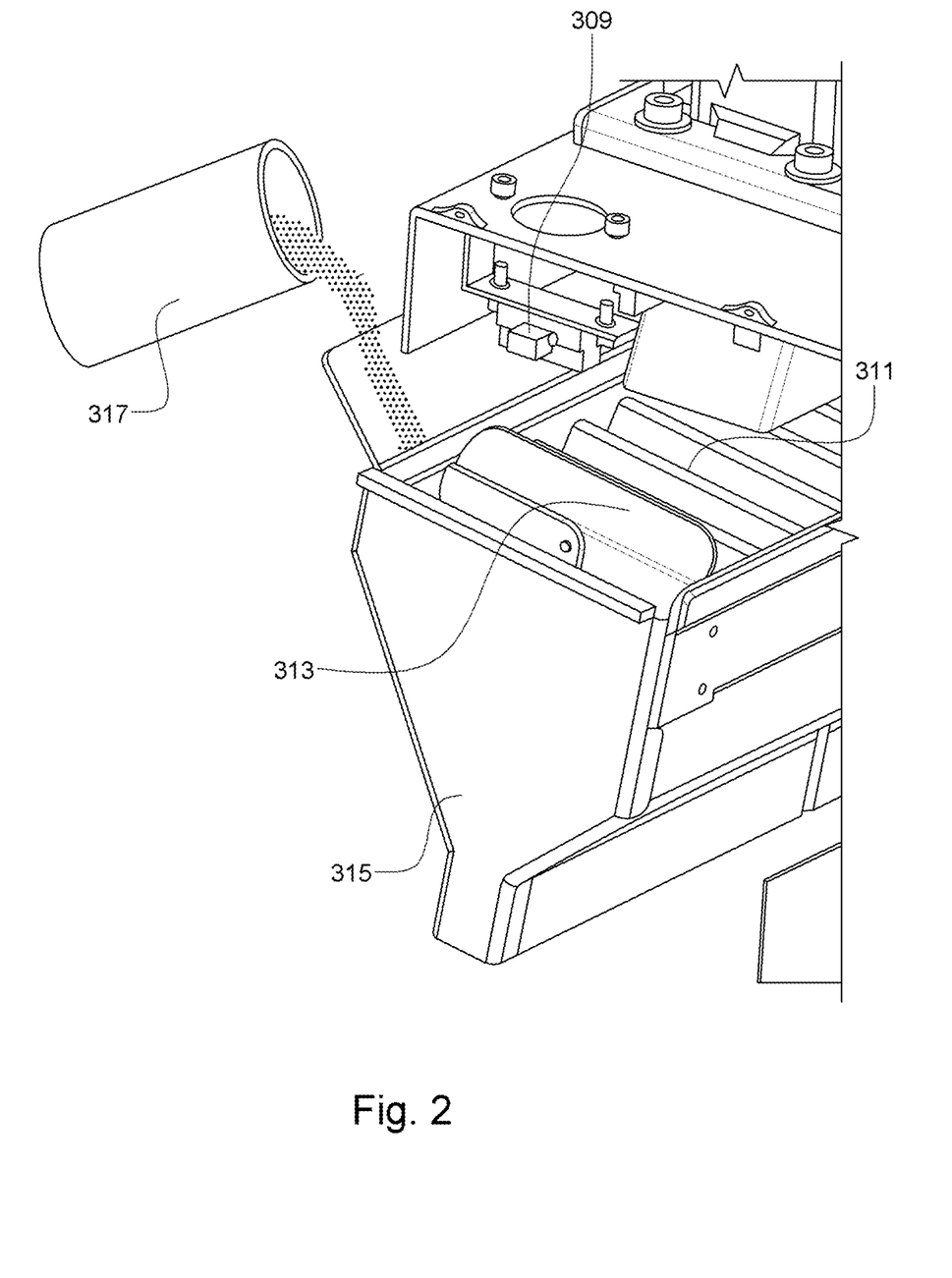
FIG. 2 shows manual powder refilling.

In the original CBAM system, the powder trough was filled using a cup (this cup 317 is shown for reference in FIG. 2. This required operator intervention and constant monitoring of the trough levels by the operator. The approach used was refilling the trough to the brim, which meant that powder was often recirculated many times. Because the cyclone system which recirculates the powder after it is vacuumed has a size cut-off point dependent on the cyclone construction, but certainly above five microns, comparisons of the initial particle size distribution of powder from the supplier and recycled powder showed that smaller particles are lost during the recycling process. Additionally, CT scans showed inconsistencies of powder loads throughout builds (See FIG. 1). Some layers 201b had more powder than others, while some layers 201a had less powder than others. This effect was thought to be related to the constant change of trough powder level during a print and the change of particle size distribution. Maintaining the smallest possible distribution change during a print requires presence of lowest practical trough level. It would be extremely advantageous to have a system that provides such control.

SUMMARY OF THE INVENTION

The present invention relates to a powder refill system for a CBAM process that makes changing a powder container simple and maintains the smallest possible distribution change during the print process. The powder refill system of the present invention automates a constantly low trough powder level during a print and reduces the number of times the powder is recirculated. The powder refill system uses a sensor to sense the amount of powder in a tray and a compressed air powder application system to force powder into the system. Powder enters the system from a powder bottle mounted upside-down on a plate with an orifice and mixing chamber and a stainless-steel "aeration stone" This is a fitting with porous walls, where porosity is finer than most of particulate matter of the powder being used. Air can enter through the fitting, broken down into microscopic streams, but powder cannot enter back into the air supplying line. The powder aerosol is then used in the printing/flooding process. A mounting plate allows easy replacement of the powder bottle.

DESCRIPTION OF THE FIGURES

Attention is now directed to several drawings that illustrate features of the present invention.

Several figures and illustrations have been provided to aid in understanding the present invention. The scope of the present invention is not limited to what is shown in the figures.

DESCRIPTION OF THE PREFERRED EMBODIMENTS

The powder refill system of the present invention automates a constantly low trough powder level during a print and reduces the number of times the powder is recirculated. The trough is shown in FIG. 2. The total system includes an in-trough powder level sensor 309 and powder container 313. The powder level sensor 309 "looks" downwards at the powder surface in the trough using an opening in the powder strainer 311 and the powder strainer frame 313 mounted on top of the trough 315. The powder level sensor can be a range sensor such as the Analog Distance Sensor model GP2Y0A21YK0F manufactured by Sharp. Reading of a longer distance to the powder surface indicates lower powder level, while a shorter distance corresponds to higher powder level.

Figure 3A:
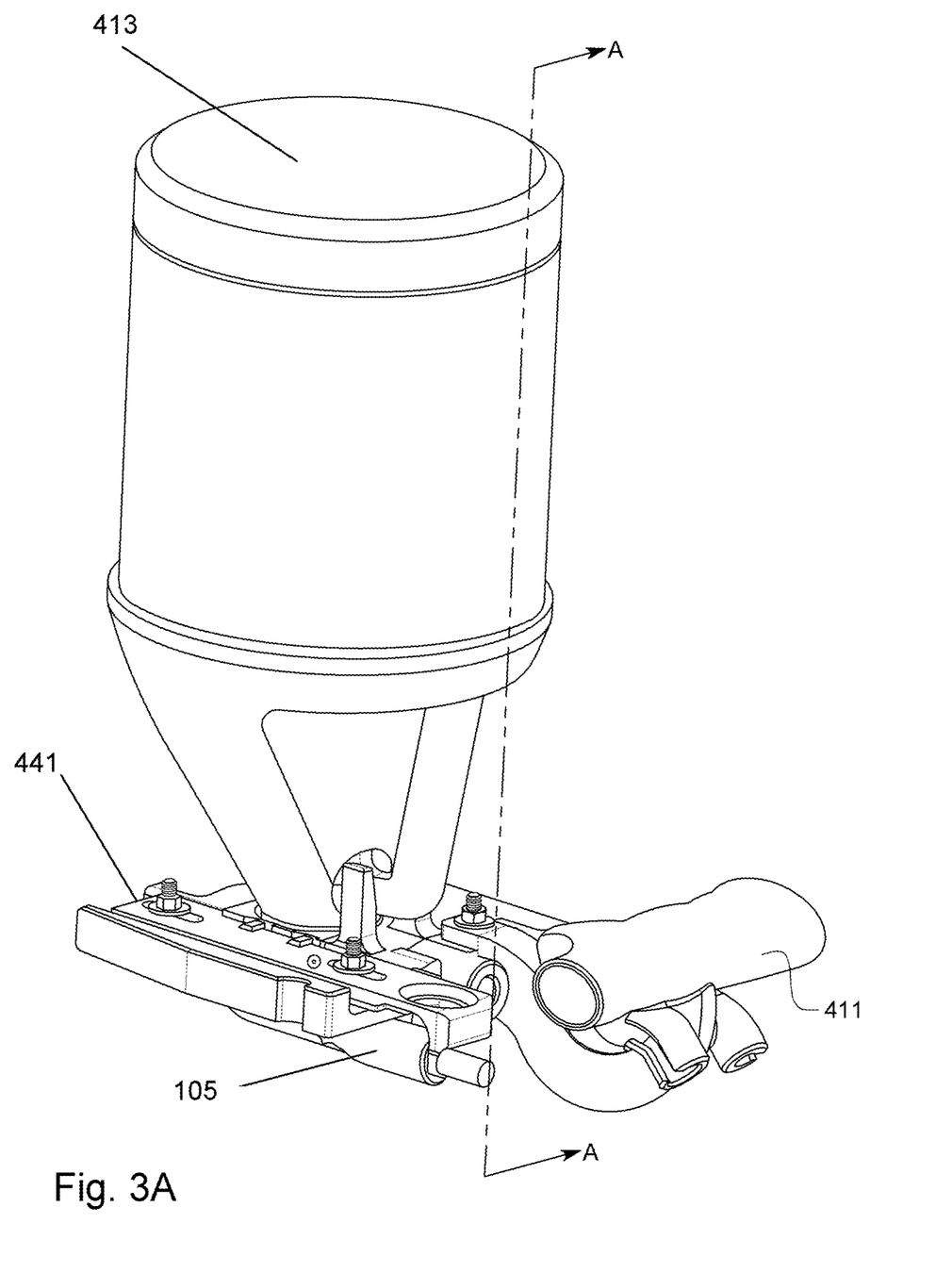
FIG. 3A shows a powder filling device according to the present invention.
Figure 3B:
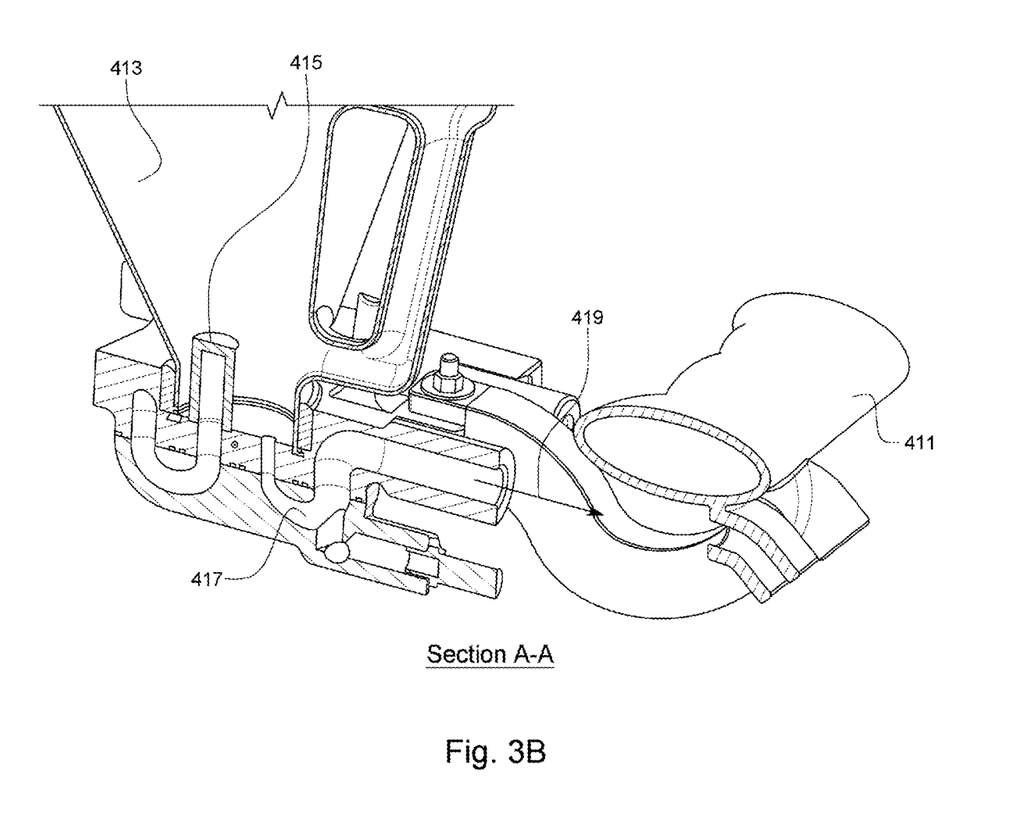
FIG. 3B shows section A-A of the device of FIG. 3A.

Turning to FIGS. 3A-3B, the powder delivery system can be seen. FIG. 3B shows a section of the assembly in FIG. 3A. The delivery system includes a powder bottle 413 mounted upside-down on a plate 441 with an internal orifice and mixing chamber 417 and a stainless-steel "aeration stone" 415 (0.5 micron porosity, commonly used in home beer aeration, 0.5"×1" hollow cylinder). This is a fitting with porous walls, where porosity is finer than most of particulate matter of the powder being used. Air can enter through the fitting, broken down into microscopic streams, but powder cannot enter back into the air supplying line. FIG. 4B also shows a handle 411, an exiting powder aerosol flow 419 to a powder collecting bowl (not shown). A dead weight 105 aids in changing powder containers as will be later explained.

Figure 4:
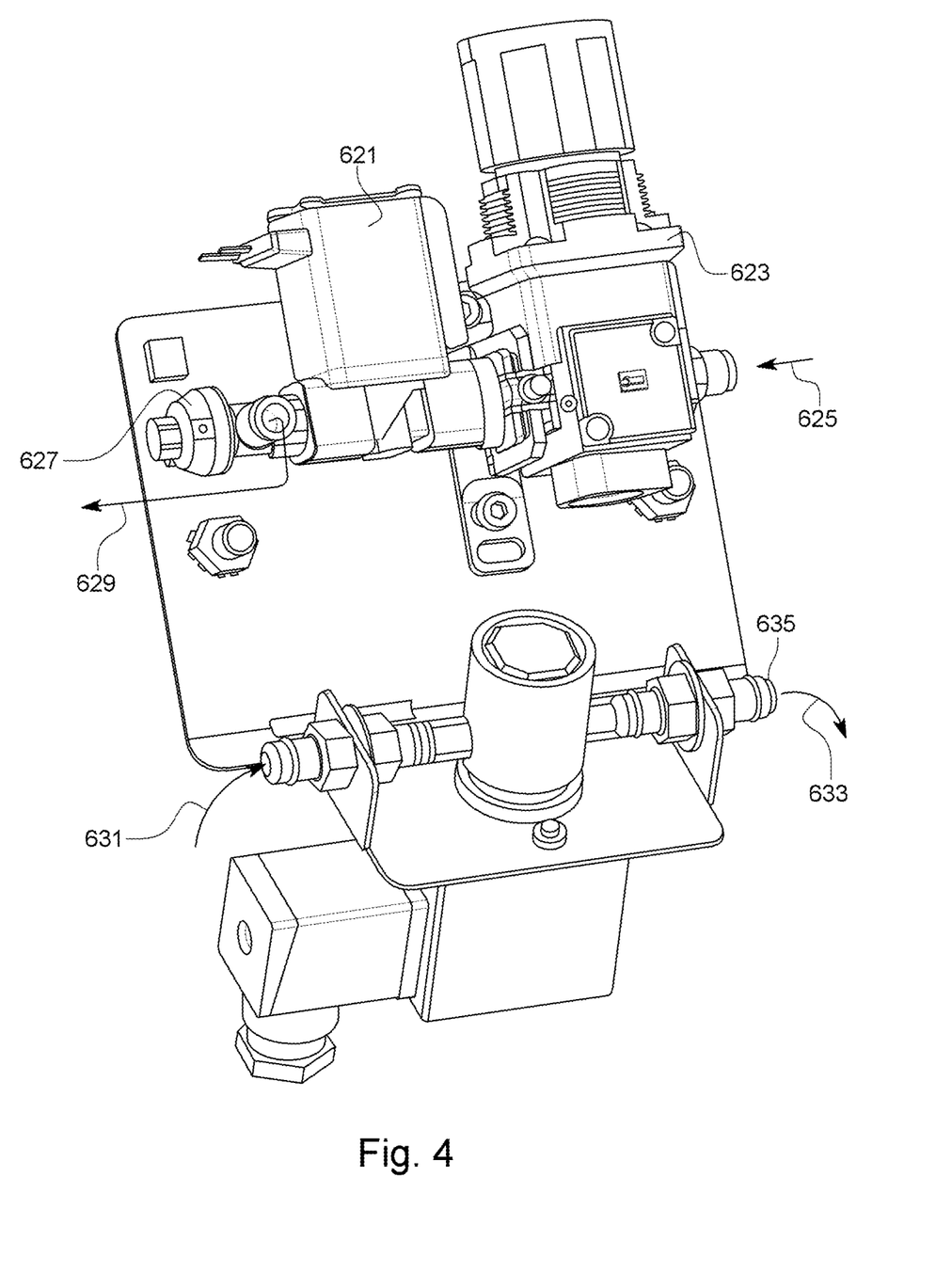
FIG. 4 shows a compressed air control system.
Figure 5:
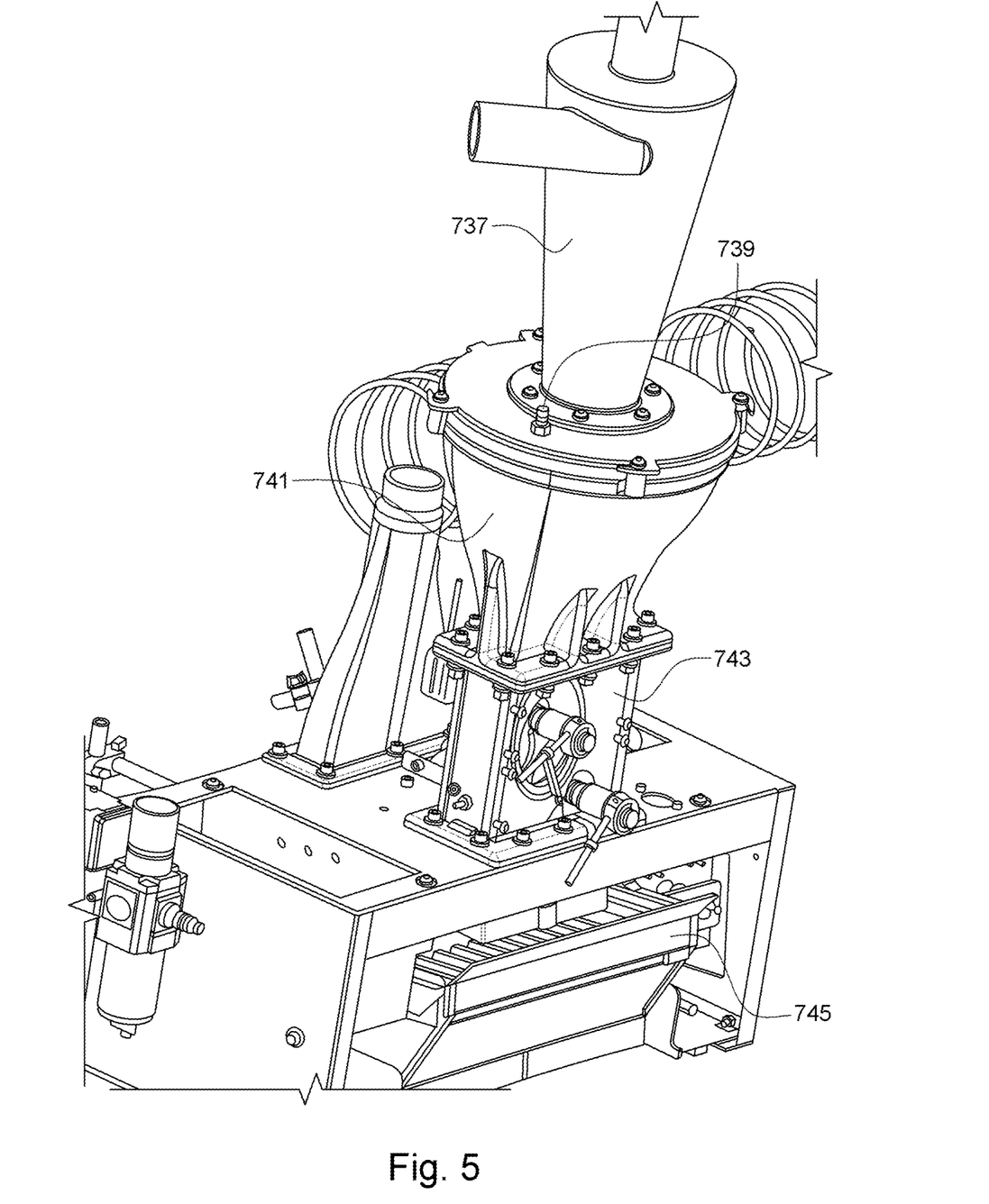
FIG. 5 shows a cyclone powder removal system and powder collector.
Figure 6:
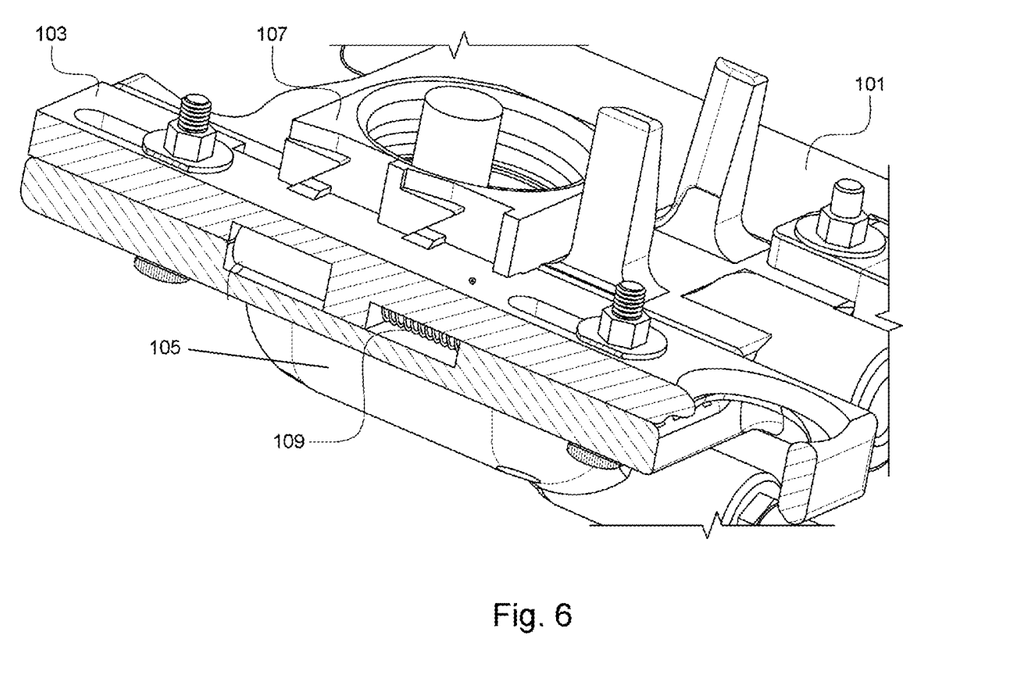
FIG. 6 shows an embodiment of a powder container mounting device attachable to a powder bottle.
Figure 7:
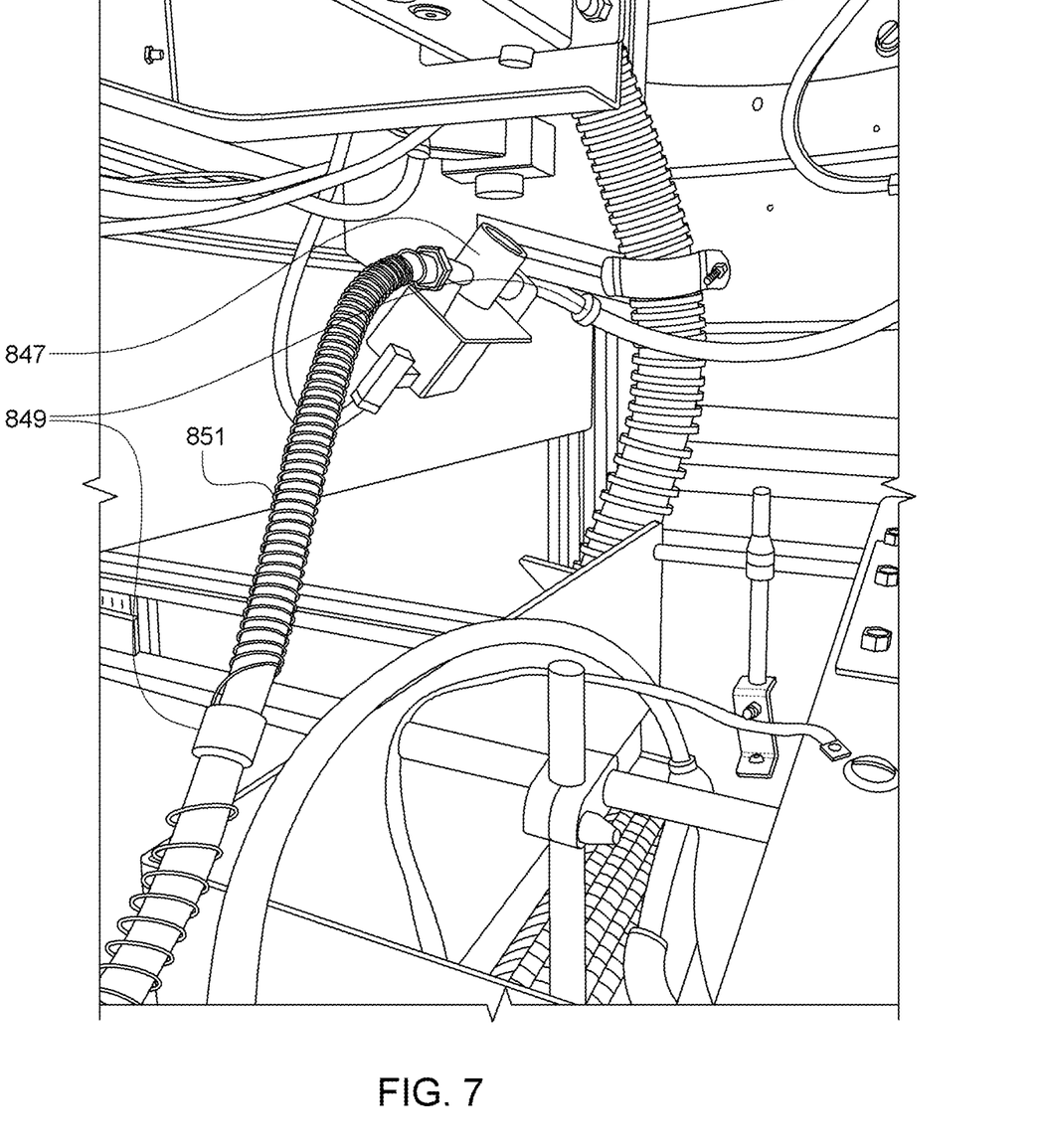
FIG. 7 shows an embodiment of plumbing connections for the present invention.

Turning to FIG. 4, there is a controller having two valves, an air valve 621 and a pinching valve, along with an airflow/pressure regulator 623 which are all part of the delivery system. Both valves open whenever the sensor indicates that more powder is needed (i.e., using traditional feedback control system principles). The air valve 621 and the airflow/pressure regulator 623 regulate the flow purging through an aeration fitting to fluidize powder in proximity of the orifice, allowing continuous powder feed during a refill. This air flow serves to increase air pressure inside powder container above atmospheric to further assist powder migration. Compressed air enters the system 625 at the pressure regulator 623. Air flow is controlled by an air flow regulator 627. Conditioned air exits 629 the air flow regulator (627) and is sent to the aeration fitting 415.

Returning to FIG. 3B, powder, passing through the orifice enters a mixing chamber 417 where a powder-air suspension is created. The powder aerosol gets carried through a tubing line connected to fitting 631 of FIG. 4, regulated with the pinching valve, to a tubing line connected to fitting 635, to the powder collecting bowl 741 (to be described in the next paragraph). The tubing has bleed-in fittings along the line approximately every 10" to add air into the tubing and keep the powder suspended to avoid clogging.

Turning to FIG. 5, the powder recirculation system (described in U.S. Published Application No. 20180264732) is independent of the powder refill system component of the machine and serves as a vacuum source and the powder receptacle. The powder recirculation system includes, but is not limited to, the cyclone powder separator 737, a powder collecting bowl 741 and a dump valve 743. A vacuum used in the powder delivery system originates in the powder collecting bowl into which powder is conveyed. Located on top of the dump valve 743, the powder collecting bowl 741 allows powder to pass from the powder delivery system through the dump valve to the atmosphere and into the trough 745. Raising the trough's powder level stops a call for powder refill and finishes a refill cycle.

FIG. 6 shows the powder container mounting device 100 that eases the powder container change procedure. It includes a gravity locking mechanism to prevent significant powder spills, and there is no threading required to remove/install a container. The device includes a mounting plate 101 as a base to where all other parts attach; a trigger/slider 107 biased with a compression spring 109 with a gravity locking feature and container constraining surfaces; and a dead weight which is a solid steel rod 105. The device's powder dispensing/operational position is as shown on FIG. 3A. In order to separate/remove the powder container from the mounting plate, it is necessary to flip the entire assembly over. While in the operating position, the dead weight migrates down under the gravity force, falls into a depression made for this purpose and locks the container so the slider is constrained in place. When the device flipped over for powder container replacement, the dead weight moves back into a cavity inside the trigger/slider, releases the slider and facilitates powder container separation from the device.

To eliminate the need of threading the device onto a powder container, a false cap is used. The cap itself is screwed on to a powder container as a normal cap would be, but it has no top. Instead, the cap has mating surfaces that make locking possible.

Once the powder container is in an upright position, the mounting plate with components is above the powder container. An operator holds the device by the handle with the right hand (that grip positions the index finger in front of the trigger), pulls the trigger and carefully slips onto or removes the mounting plate and components from top of the powder container (false cap). This process is reversed to attach a new powder container to the mounting plate. After the new powder container installation, the whole assembly is flipped over to bring it into the operational position shown in FIG. 3A. The mounting plate with the new powder container is then re-attached to the machine.

FIG. 7 shows an embodiment of plumbing connections for the present invention. A pinching valve 847 is shown attached to the powder feed line 851. Bleed-in fittings 849 are shown on the powder feed line on both sides of the pinching valve.

While the written description above uses the example of sheets as the substrate, the principles of the invention described herein have equal applicability to web or roll based feeding of substrate material.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A powder refill sub-system for a composite-based additive manufacturing (CBAM) system comprising:

a sensor sensing a powder quantity in a powder trough, the sensor coupled to a control system that activates a regulated air flow when the powder quantity is sensed to be below a threshold;

a powder delivery system connected to the regulated air flow comprising a powder bottle with an orifice, a regulated air flow inward connection comprising a porous surface with porosity finer than particulate matter of the powder, and an outward connection configured to contain and deliver a powder aerosol;

a powder collecting bowl disposed between the powder delivery system and the powder trough;

such that air supply through to the porous surface conveys a powder aerosol into the powder collecting bowl when the sensor detects that the powder quantity is below the threshold;

wherein the powder delivery system includes a powder container holder comprising:

a mounting plate;

a trigger/slider with gravity locking feature and container constraining surfaces;

a dead weight;

a false cap; and the powder container holder having an operational state and a refill state, wherein flipping the mounting plate over changes from the operation state to the replacement state and flipping the mounting plate over again changes from the replacement state to the operational state, wherein, in the operational state, the dead weight falls into a depression locking the trigger/slider, and in the replacement state, the dead weight moves out of the depression releasing the trigger/slider;

the false cap constructed to attach to a powder container in the replacement state when a trigger on the trigger/slider is pulled.

2. The powder refill sub-system for a CBAM system of claim 1 further comprising an air valve, a pinching valve, and a pressure regulator that creates the regulated air flow.

3. The powder refill sub-system for a CBAM system of claim 2 wherein regulated air flow commences by the air valve and the pinching valve both opening in response to the sensor detecting powder in the trough below the threshold.

4. The powder refill sub-system for a CBAM system of claim 1 further comprising first flexible tubing connecting the regulated airflow to the inward connection, and second flexible tubing connecting the outward connection to the powder collecting bowl.

5. The powder refill sub-system for a CBAM system of claim 4 wherein the second flexible tubing comprises at least one bleed-in fitting for keeping powder contained therein in a suspended state.

\* \* \* \* \*